(12) United States Patent
Baxter et al.

(10) Patent No.: US 10,543,456 B2
(45) Date of Patent: Jan. 28, 2020

(54) METHOD FOR SEPARATING COMPONENTS USING SOLIDS PRODUCING MULTI-STAGE DIRECT AND INDIRECT-CONTACT EXCHANGE

(71) Applicants: Larry Baxter, Orem, UT (US); Christopher Hoeger, Provo, UT (US); Stephanie Burt, Provo, UT (US); Kyler Stitt, Lindon, UT (US); Eric Mansfield, Spanish Fork, UT (US); Aaron Sayre, Spanish Fork, UT (US); David Frankman, Provo, UT (US); Andrew Baxter, Spanish Fork, UT (US); Nathan Davis, Bountiful, UT (US)

(72) Inventors: Larry Baxter, Orem, UT (US); Christopher Hoeger, Provo, UT (US); Stephanie Burt, Provo, UT (US); Kyler Stitt, Lindon, UT (US); Eric Mansfield, Spanish Fork, UT (US); Aaron Sayre, Spanish Fork, UT (US); David Frankman, Provo, UT (US); Andrew Baxter, Spanish Fork, UT (US); Nathan Davis, Bountiful, UT (US)

(73) Assignee: Hall Labs LLC, Provo, UT (US)

( * ) Notice: Subject to any disclaimer, the term of this patent is extended or adjusted under 35 U.S.C. 154(b) by 256 days.

(21) Appl. No.: 15/495,217

(22) Filed: Apr. 24, 2017

(65) Prior Publication Data

US 2018/0306495 A1  Oct. 25, 2018

(51) Int. Cl.
*B01D 53/26* (2006.01)
*B01D 53/00* (2006.01)

(52) U.S. Cl.
CPC ......... *B01D 53/265* (2013.01); *B01D 53/002* (2013.01); *B01D 2256/16* (2013.01);
(Continued)

(58) Field of Classification Search
CPC ............... B01D 53/265; B01D 53/002; B01D 2256/16; B01D 2256/20; B01D 2256/24;
(Continued)

(56) References Cited

U.S. PATENT DOCUMENTS

| | | | | |
|---|---|---|---|---|
| 4,734,116 A | * | 3/1988 | Ehrsam | C02F 1/22 137/13 |
| 4,769,054 A | * | 9/1988 | Steigman | B01D 8/00 62/54.1 |

(Continued)

*Primary Examiner* — Kun Kai Ma

(57) ABSTRACT

A process for forming a solid product or products is disclosed. The process is provided with n desublimating exchangers. An exchanger E1 being associated with a first exchanger and an exchanger En being associated with an nth exchanger, n representing the number of exchangers. The n exchangers comprise at least one direct-contact exchanger comprising a contact fluid. A process fluid is passed through the n exchangers in order from E1 through En. The process fluid comprises a product component or components. The solid product or products form from the product component or components in the plurality of exchangers by desublimation. The solid product or products are separated from the process fluid. In this manner, a solid product or products is formed.

16 Claims, 5 Drawing Sheets

(52) U.S. Cl.
CPC ...... *B01D 2256/20* (2013.01); *B01D 2256/24* (2013.01); *B01D 2256/245* (2013.01); *B01D 2257/302* (2013.01); *B01D 2257/304* (2013.01); *B01D 2257/404* (2013.01); *B01D 2257/408* (2013.01); *B01D 2257/504* (2013.01); *B01D 2257/602* (2013.01); *B01D 2257/702* (2013.01); *B01D 2257/80* (2013.01); *B01D 2258/0283* (2013.01)

(58) Field of Classification Search
CPC ........ B01D 2256/245; B01D 2257/302; B01D 2257/304; B01D 2257/404; B01D 2257/504; B01D 2257/702; B01D 2257/80
See application file for complete search history.

(56) References Cited

U.S. PATENT DOCUMENTS

| | | | | |
|---|---|---|---|---|
| 5,969,178 A | * | 10/1999 | Okamoto | C07C 45/35 560/208 |
| 8,764,885 B2 | * | 7/2014 | Baxter | B01D 7/02 95/226 |
| 2006/0255323 A1 | * | 11/2006 | Seki | A61K 9/145 252/519.21 |
| 2009/0004713 A1 | * | 1/2009 | Wynn | B01D 53/228 435/161 |
| 2010/0197947 A1 | * | 8/2010 | Narahara | B01J 23/44 549/533 |
| 2010/0279181 A1 | * | 11/2010 | Adams, II | B01D 53/265 429/410 |
| 2012/0030962 A1 | * | 2/2012 | Nandi | B01D 53/002 34/282 |
| 2012/0153514 A1 | * | 6/2012 | Baxter | B01D 7/02 261/128 |
| 2012/0272824 A1 | * | 11/2012 | Menzel | B01D 53/263 95/185 |
| 2013/0032472 A1 | * | 2/2013 | Holler | B01D 53/265 204/262 |
| 2014/0090415 A1 | * | 4/2014 | Reddy | B01D 7/02 62/602 |
| 2017/0354923 A1 | * | 12/2017 | Zehnacker | B01D 53/22 |

* cited by examiner

METHOD FOR SEPARATING COMPONENTS USING SOLIDS PRODUCING MULTI-STAGE DIRECT AND INDIRECT-CONTACT EXCHANGE

This invention was made with government support under DE-FE0028697 awarded by The Department of Energy. The government has certain rights in the invention.

FIELD OF THE INVENTION

This invention relates generally to gas-vapor separations. More particularly, we are interested in separating components like carbon dioxide from carrier gases like flue gas.

BACKGROUND

The ability to separate gases and vapors increases in difficulty as the number of vapor components in the gas increases. Some gases, such as flue gas and other industrial gases, are extremely complex and separation of components such as water, acid gases like carbon dioxide, and heavy metals are made even more complex by the broad disparities in freezing points and chemical properties. Excellent progress has been made in removing these components, but no efficient and simple process has been developed before now that is capable of removing all of these components. A process requiring a minimum number of unit operations and requiring a minimum energy cost while still producing complete separation is required.

U.S. Pat. No. 6,962,061, to Wilding, et al., teaches an apparatus for the liquefaction of natural gas and related methods. An unpurified natural gas source is cooled in indirect-contact heat exchangers, expanded to create work, driving a compressor which compresses the process stream, which is then cooled. In this manner, solid carbon dioxide is produced in a liquid natural gas and separated in a hydrocyclone. The present disclosure differs from this disclosure in that the carrier gas is liquefied, only indirect-contact heat exchangers are used, compression and expansion are required, and the solid produced is not separated from the carrier gas, natural gas, but rather is solidified and remains in the natural gas and has to be further separated, rather than being separated by leaving the natural gas as a gas. This disclosure is pertinent and may benefit from the methods disclosed herein and is hereby incorporated for reference in its entirety for all that it teaches.

U.S. Pat. No. 8,764,885, to Baxter, et al., teaches a system and method for separating condensable vapors from gases by desublimation and other solidification processes in a direct-contact heat exchanger. The present disclosure differs from this disclosure in that a single exchanger is used for desublimating exchange, rather than a plurality of desublimating exchangers, and all desublimation and solidification of all foulants occurs in the single desublimating exchanger rather than a portion of foulant in a plurality of exchangers. This disclosure is pertinent and may benefit from the methods disclosed herein and is hereby incorporated for reference in its entirety for all that it teaches.

U.S. Pat. No. 5,467,722, to Meratla, teaches a method and apparatus for removing pollutants from flue gas. A flue gas is compressed and passed through a series of indirect-contact heat exchangers, removing water, nitrogen dioxide, sulfur dioxide, and carbon dioxide from the first through fourth stages, respectively. The present disclosure differs from this disclosure in that only indirect-contact heat exchangers are used and initial compression is required. This disclosure is pertinent and may benefit from the methods disclosed herein and is hereby incorporated for reference in its entirety for all that it teaches.

SUMMARY

A process for forming a solid product or products is disclosed. The process is provided with n exchangers. An exchanger E1 being associated with a first exchanger and an exchanger En being associated with an nth exchanger, n representing the number of exchangers. The n exchangers comprise at least one direct-contact exchanger comprising a contact fluid. A process fluid is passed through the n exchangers in order from E1 through En. The process fluid comprises a product component or components. The solid product or products form from the product component or components in the plurality of exchangers by desublimation. The solid product or products are separated from the process fluid. In this manner, a solid product or products is formed.

At least one of the n exchangers may comprise an indirect-contact heat exchanger comprising a first chamber through which the process fluid passes and a second chamber through which a coolant passes. The indirect-contact heat exchanger may comprise a shell and tube style exchanger, plate style exchanger, plate and frame style exchanger, plate and shell style exchanger, spiral style exchanger, plate fin style exchanger, or combinations thereof. The forming step may be accomplished by a portion of the product component or components desublimating to form a portion of the solid product or products on an outer surface of the second chamber. The separating step may be accomplished by providing the indirect-contact heat exchanger with a means for causing the second chamber to flex, causing the portion of the solid product or products to fall from the outer surface of the second chamber and removing the portion of the solid product or products from the indirect-contact heat exchanger. The means for causing the second chamber to flex may comprise a vibration inducing device attached to a portion of the indirect-contact heat exchanger, varying a pressure of the coolant, or combinations thereof. The vibration inducing device may comprise a piezoelectric actuator, ultrasound emitter, voice coil, linear resonant actuator, shaker, exciter, hydraulic actuator, solenoid actuator, blunt object, manual shaking, or a combination thereof. The varying the coolant pressure step may be further accomplished by constructing the second chamber from expanding and contracting corrugated tubes, wherein varying the pressure of the coolant causes the corrugated tubes to expand and contract. The varying the coolant pressure step may be accomplished by a pump operating at variable speeds, a valve rapidly opening and closing, or a combination thereof, causing the inner chamber to experience a hammering.

The direct-contact exchanger may comprise spray towers, bubble contactors, mechanically agitated towers, direct-contact heat exchangers, direct-contact material exchangers, direct-contact heat and material exchangers, distillation columns, or combinations thereof. A gas distributor may be provided to the direct-contact exchanger, the gas distributor comprising a bubble plate, a bubble tray, a sparger, a nozzle, or a combination thereof. The contact fluid may comprise a solvent or a mixture of a solvent and a compound. The solvent may comprise water, hydrocarbons, liquid ammonia, liquid carbon dioxide, cryogenic liquids, or combinations thereof. The compound may comprise ionic compounds or soluble organic compounds. The ionic compounds may comprise potassium carbonate, potassium formate, potassium acetate, calcium magnesium acetate, magnesium chloride, sodium chloride, lithium chloride, calcium chloride, or combinations thereof. The soluble organic compounds may comprise glycerol, ammonia, propylene glycol, ethylene glycol, ethanol, methanol, or combinations thereof. The forming step may be accomplished by a portion of the product component or components desublimating in the contact fluid to produce a product-depleted process fluid and a portion of the solid product or products and entraining the portion of the solid product or products in the contact fluid to form a contact fluid slurry. The separating step may be accomplished by removing the product-depleted process fluid from the direct-contact exchanger, passing the contact fluid slurry to a separation vessel, separating the portion of the product or products from the contact fluid slurry, and reconstituting the contact fluid for recycle. The separating and reconstituting steps may be accomplished by a process comprising distillation, pressure-swing separation, liquid extraction, solid extraction, reverse osmosis, forward osmosis, filtration, stripping, or a combination thereof.

The process fluid may comprise flue gas, syngas, producer gas, natural gas, steam reforming gas, hydrocarbons, light gases, refinery off-gases, organic solvents, water, ammonia, liquid ammonia, or combinations thereof. The product component or components may comprise carbon dioxide, nitrogen oxide, sulfur dioxide, nitrogen dioxide, sulfur trioxide, hydrogen sulfide, hydrogen cyanide, water, mercury, hydrocarbons, pharmaceuticals, salts, biomass, or combinations thereof.

In some instances, contact fluids from one direct-contact stage may recuperate heat from product streams of the previous direct-contact stage.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1:
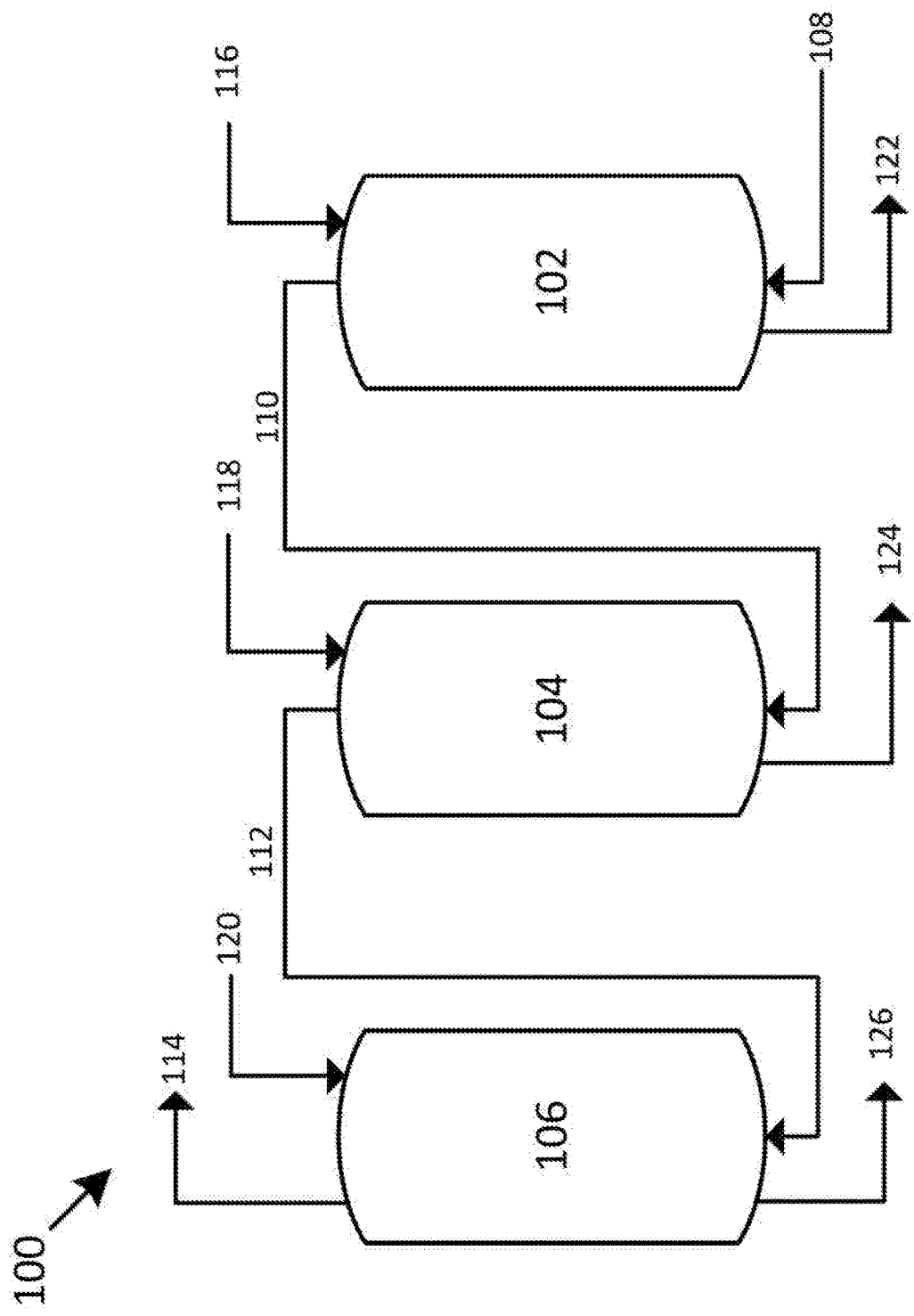
FIG. 1 shows a process flow diagram for forming a solid product or products.

Referring to FIG. 1, a process flow diagram for forming a solid product or products is shown at 100, as per one embodiment of the present invention. Three direct-contact exchangers (DCE) 102, 104, and 106 are provided. Process fluid 108 passes through DCE 102 against first contact fluid 116. A first portion of a product component or components desublimates into first contact fluid 116, resulting in first product-depleted process fluid 110 and a first portion of the solid product or products entraining in first contact fluid 116, producing first contact fluid slurry 122. First product-depleted process fluid 110 passes through DCE 104 against second contact fluid 118. A second portion of the product component or components desublimates into second contact fluid 118, resulting in second product-depleted process fluid 112 and a second portion of solid product or products entraining in second contact fluid 118, producing second contact fluid slurry 124. Second product-depleted process fluid 112 passes through DCE 106 against final contact fluid 120. A final portion of the product component or components desublimates into final contact fluid 120, resulting in final product-depleted process fluid 114 and a final portion of solid product or products entraining in final contact fluid 120, producing final contact fluid slurry 126. In some embodiments, first contact fluid slurry 122 is sent to a first separation system, wherein the first portion of the solid product or products is separated from the first contact fluid and the first contact fluid is reconstituted for recycle to DCE 102. In some embodiments, second contact fluid slurry 124 is sent to a second separation system, wherein the second portion of the solid product or products is separated from the second contact fluid and the second contact fluid is reconstituted for recycle to DCE 104. In some embodiments, final contact fluid slurry 126 is sent to a final separation system, wherein the final portion of the solid product or products is separated from the final contact fluid and the final contact fluid is reconstituted for recycle to DCE 106. The term reconstituted is herein used to mean providing necessary heating, cooling, pressurization, depressurization, makeup solvent, or makeup compounds to compensate for heat, pressure, and materials lost or gained during normal industrial operations.

Figure 2:
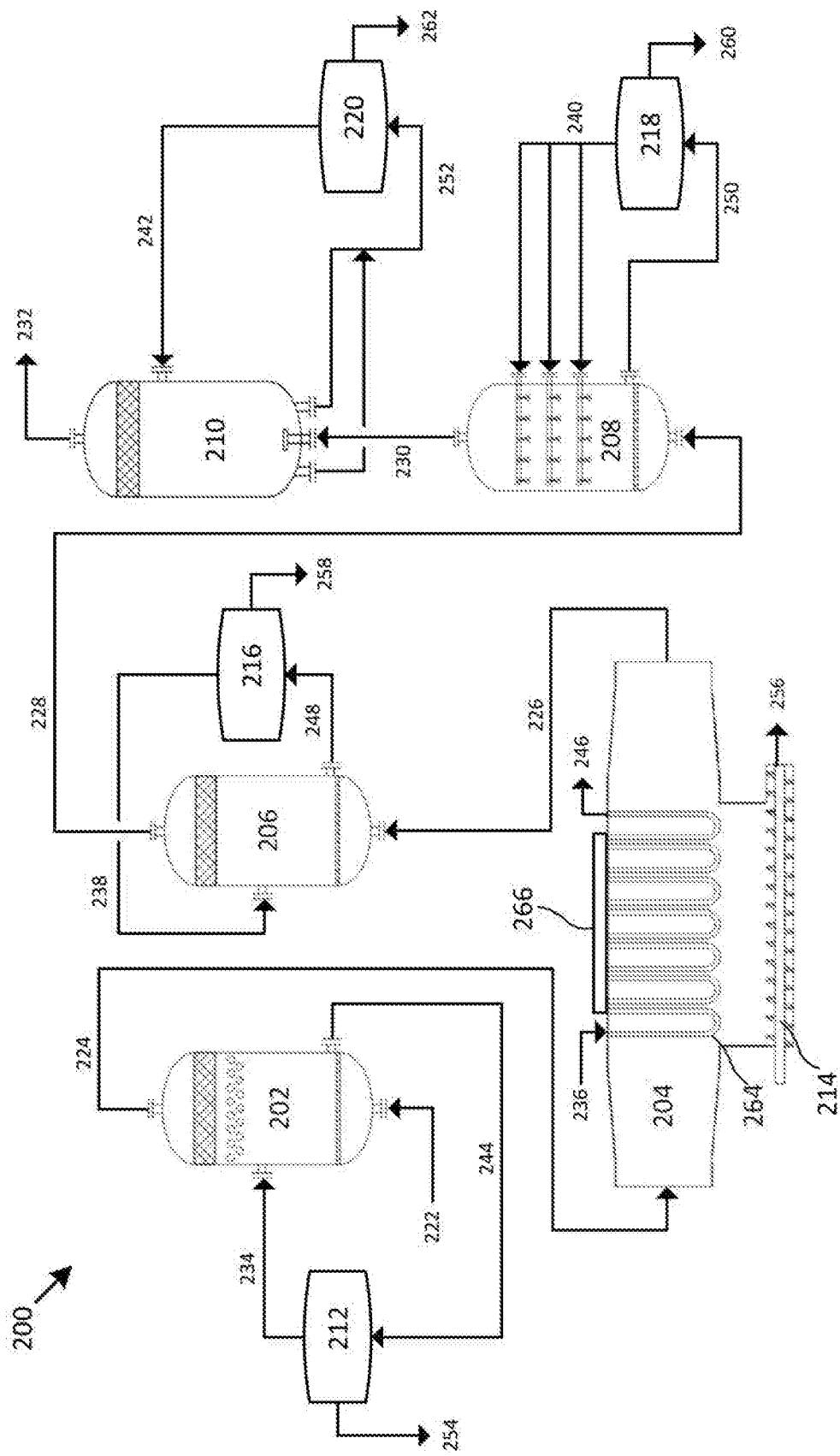
FIG. 2 shows a process flow diagram for forming solid products.

Referring to FIG. 2, a process flow diagram for forming solid products is shown at 200, as per one embodiment of the present invention. Four direct-contact exchangers (DCE) 202, 206, 208, and 210 and one indirect-contact heat exchanger (ICHE) 204 are provided. Combustion flue gas 222 passes through DCE 202 against first contact fluid 234. First contact fluid 234 comprises water and potassium acetate. Water crystallizes, freezes, condenses coupled with solidification, or a combination thereof into first contact fluid 234, resulting in water-depleted combustion flue gas 224 and water ice entraining in first contact fluid 234, producing first contact fluid slurry 244. First contact fluid slurry 244 is passed to separation system 212. Separation system 212 removes water 254 and reconstitutes first contact fluid 234 for recycle to DCE 202. Water-depleted combustion flue gas 224 is passed through ICHE 204 and is cooled by coolant 236, causing any remaining water to freeze against tube bundles 264. Tube bundles 264 are caused to flex by vibration inducing device 266, attached to ICHE 204, such that water ice 256 flakes off and settles into screw conveyor 214 and is removed from ICHE 204. The removal of this remaining water results in dry combustion flue gas 226, which is passed out of ICHE 204 and through DCE 206 against second contact fluid 238. Second contact fluid 238 comprises water and lithium chloride. Nitrogen dioxide desublimates into second contact fluid 238, resulting in NO2-depleted combustion flue gas 228 and frozen nitrogen dioxide entraining in second contact fluid 238, producing second contact fluid slurry 248. Second contact fluid slurry 248 is passed to separation system 216. Separation system 216 removes frozen nitrogen dioxide 258 and reconstitutes second contact fluid 238 for recycle to DCE 206. NO2-depleted combustion flue gas 228 passes through DCE 208 against third contact fluid 240. Third contact fluid 240 comprises ethanol. Sulfur dioxide desublimates into third contact fluid 240, resulting in SO2-depleted combustion flue gas 230 and frozen sulfur dioxide entraining in third contact fluid 240, producing third contact fluid slurry 250. Third contact fluid slurry 250 is passed to separation system 218. Separation system 218 removes frozen sulfur dioxide 260 and reconstitutes third contact fluid 240 for recycle to DCE 208. SO2-depleted combustion flue gas 230 passes through DCE 210 against final contact fluid 242. Final contact fluid 242 comprises isopentane. Carbon dioxide desublimates into final contact fluid 242, resulting in CO2-depleted combustion flue gas 232 and frozen carbon dioxide entraining in final contact fluid 242, producing final contact fluid slurry 252. Final contact fluid slurry 252 is passed to separation system 220. Separation system 220 removes frozen carbon dioxide 262 and reconstitutes final contact fluid 242 for recycle to DCE 210.

Figure 3:
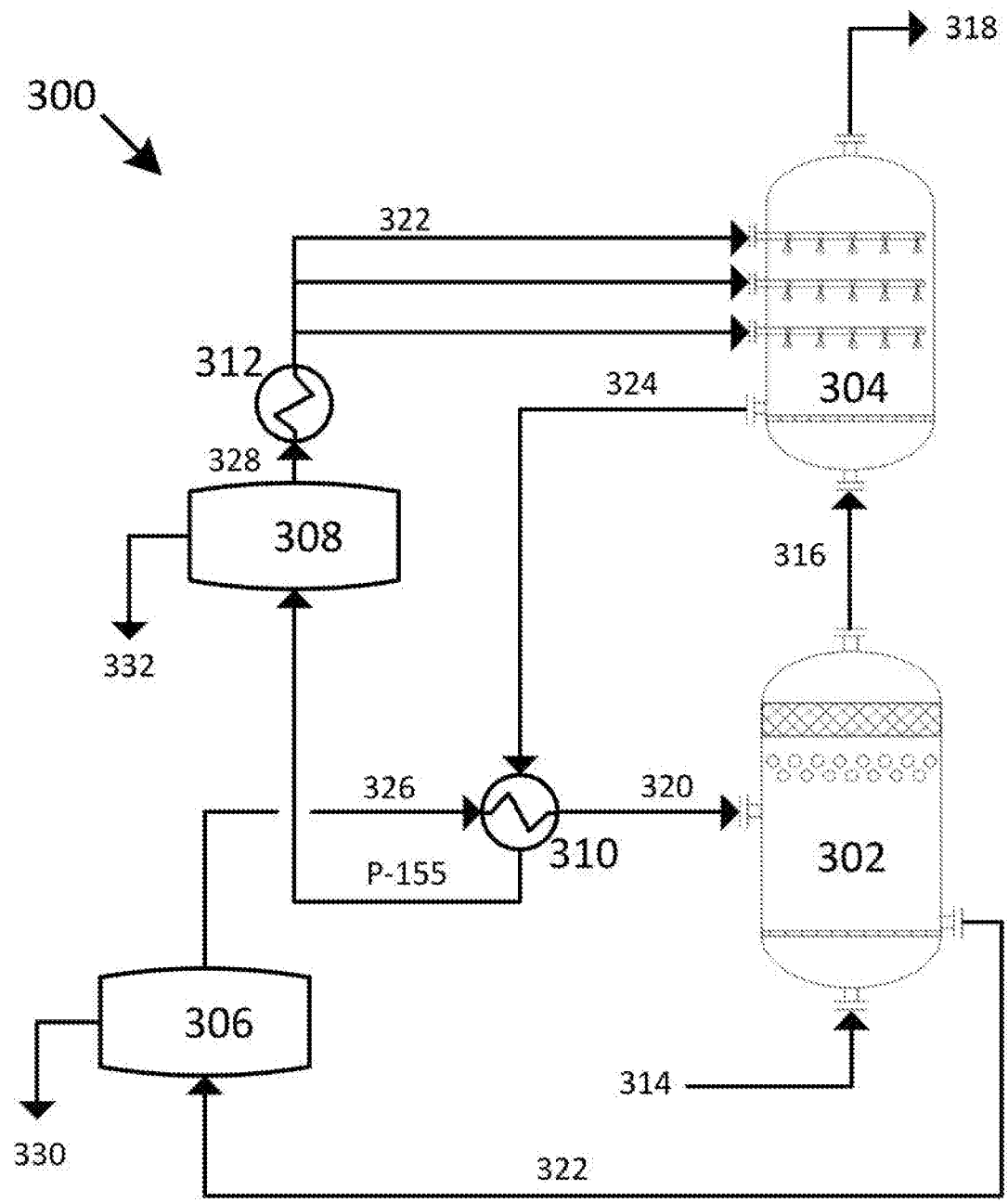
FIG. 3 shows a process flow diagram for forming a solid product.

Referring to FIG. 3, a process flow diagram for forming a solid product is shown at 300, as per one embodiment of the present invention. Two direct-contact exchangers (DCE) 302 and 304 are provided. Dry natural gas 314 passes through DCE 302 against first contact fluid 320. First contact fluid 320 comprises methanol. A portion of the carbon dioxide in natural gas 314 desublimates into first contact fluid 320, resulting in CO2-depleted natural gas 316 and carbon dioxide ice entraining in first contact fluid 320, producing first contact fluid slurry 322. First contact fluid slurry 322 is passed to separation system 306. Separation system 306 removes carbon dioxide 330 and passes partially-reconstituted contact fluid 326 to recuperator 310 where partially-reconstituted contact fluid 326 is cooled against final contact liquid slurry 324, completing reconstitution of first contact fluid 320 for recycle to DCE 302. CO2-depleted combustion flue gas 316 is passed through DCE 304 against final contact fluid 322. First contact fluid 322 comprises isopentane. The remaining carbon dioxide in natural gas 314 desublimates into final contact fluid 322, resulting in CO2-free natural gas 318 and carbon dioxide ice entraining in final contact fluid 322, producing final contact fluid slurry 324. Final contact fluid slurry 324 is passed through recuperator 310 to provide cooling to partially-reconstituted contact fluid 326 and to separation system 308. Separation system 308 removes carbon dioxide 332 and passes partially-reconstituted contact fluid 328 to heat exchanger 312 where partially-reconstituted contact fluid 328 is cooled against an external coolant, completing reconstitution of final contact fluid 322 for recycle to DCE 304.

Figure 4:
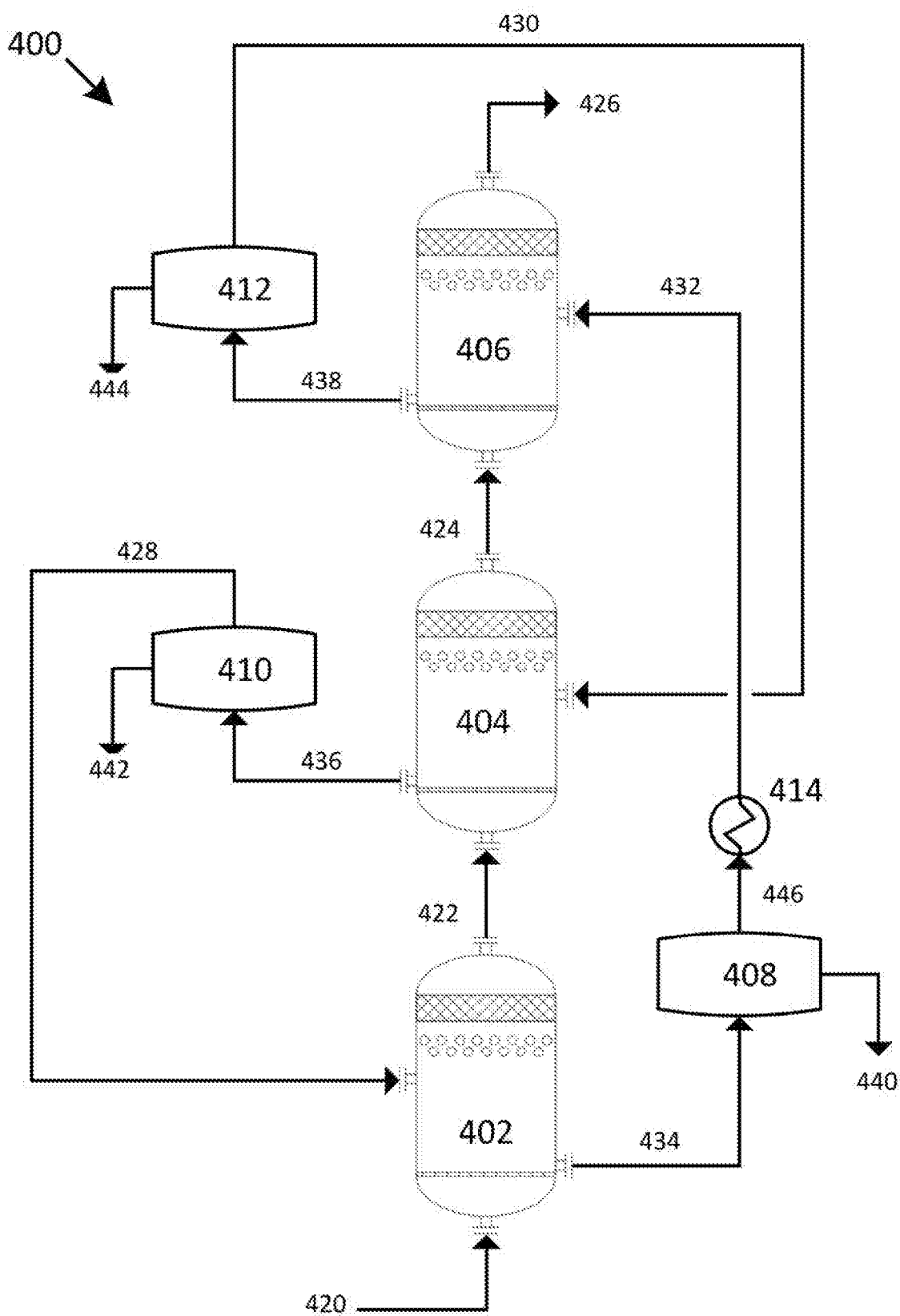
FIG. 4 shows a process flow diagram for forming a solid product or products.

Referring to FIG. 4, a process flow diagram for forming a solid product or products is shown at 400, as per one embodiment of the present invention. Three direct-contact exchangers (DCE) 402, 404 and 406 are provided. Process fluid 420 is passed through DCE 402 against first contact fluid 428. A first portion of a product component or components desublimates into first contact fluid 428, resulting in first product-depleted process fluid 422 and a first portion of the solid product or products entraining in first contact fluid 428, producing first contact fluid slurry 434. First contact fluid slurry 434 is passed to separation system 408. Separation system 408 removes the first portion of the solid product or products as first stage product 440 and modifies the remainder of first contact fluid slurry 434 to produce warm final contact fluid 446, which is cooled across heat exchanger 414 to produce final contact fluid 432. First product-depleted process fluid 422 is passed through DCE 404 against second contact fluid 430. A second portion of a product component or components desublimates into second contact fluid 430, resulting in second product-depleted process fluid 424 and a second portion of the solid product or products entraining in second contact fluid 430, producing second contact fluid slurry 436. Second contact fluid slurry 436 is passed to separation system 410. Separation system 410 removes the second portion of the solid product or products as second stage product 442 and modifies the remainder of second contact fluid slurry 436 to produce first contact fluid 428. Second product-depleted process fluid 424 is passed through DCE 406 against final contact fluid 432. A final portion of a product component or components desublimates into final contact fluid 432, resulting in final product-depleted process fluid 426 and a final portion of the solid product or products entraining in final contact fluid 432, producing final contact fluid slurry 438. Final contact fluid slurry 438 is passed to separation system 412. Separation system 412 removes the final portion of the solid product or products as final stage product 444 and modifies the remainder of final contact fluid slurry 438 to produce first contact fluid 430.

Figure 5:
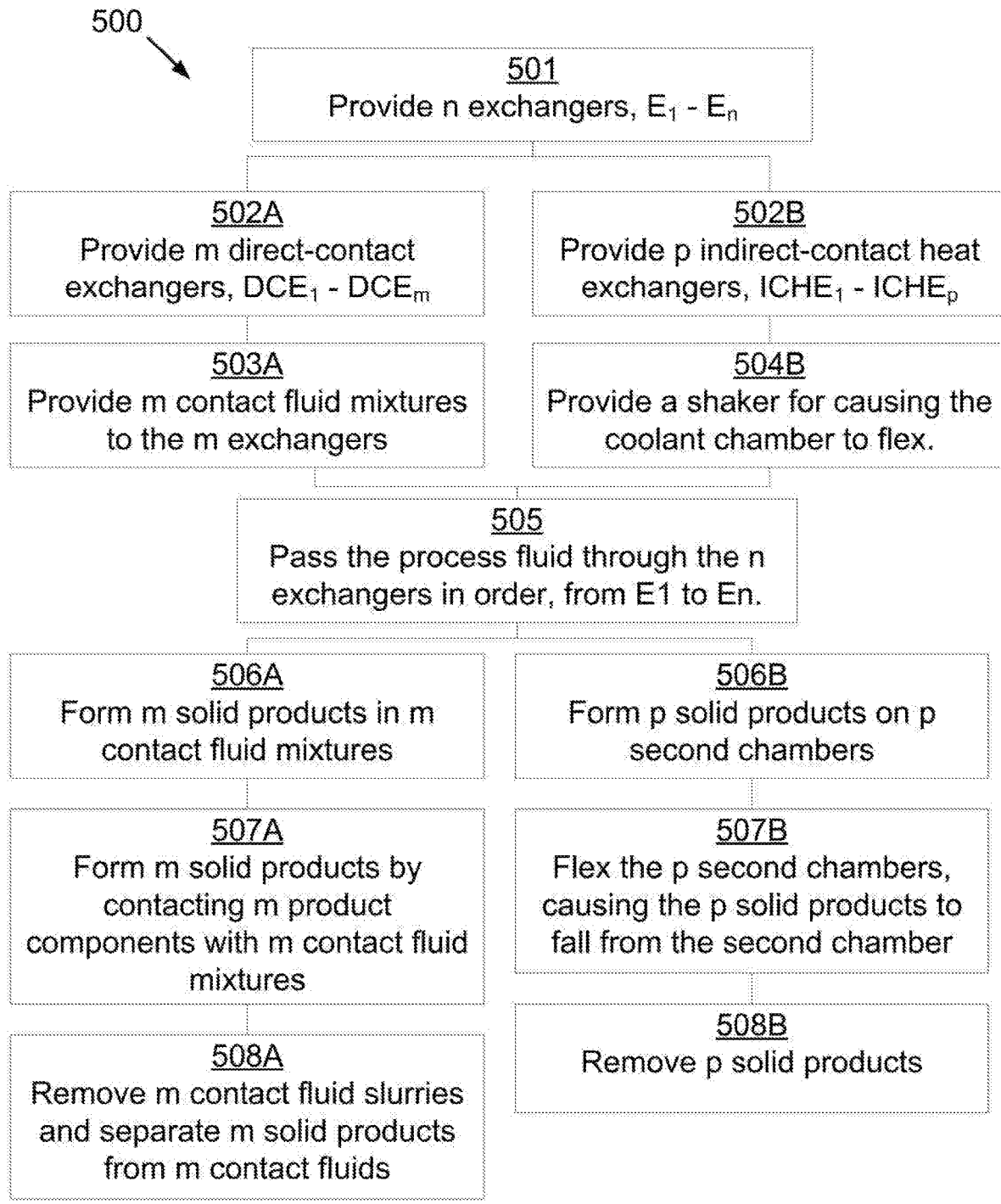
FIG. 5 shows a process flow diagram for forming a solid product or products.

Referring to FIG. 5, a process for forming a solid product or products is shown at 500, as per one embodiment of the present invention. The process provides n exchangers, an exchanger E1 being associated with a first exchanger and an exchanger En being associated with an nth exchanger, n representing the number of exchangers 501. Then exchangers comprise m direct-contact exchangers, m representing the number of direct-contact exchangers and having a value between 1 and n, wherein a direct-contact exchanger DCE1 is associated with a first direct-contact exchanger and a direct-contact exchanger DCEm is associated with an mth direct-contact exchanger 502A. The m direct-contact exchangers further comprise m contact fluids, comprising a mixture of a solvent and a compound 503A. The m direct-contact exchangers further comprise a mixture of spray towers, bubble contactors, mechanically agitated towers, direct-contact heat exchangers, direct-contact material exchangers, direct-contact heat and material exchangers, and distillation columns.

The n exchangers further comprise p indirect-contact heat exchangers, p representing the difference between n and m, wherein an indirect-contact heat exchanger ICHE1 is associated with a first indirect-contact exchanger and an indirect-contact heat exchanger ICHEp is associated with a pth indirect-contact heat exchanger 502B. The p indirect-contact heat exchangers comprise a first chamber through which the process fluid passes and a second chamber through which a coolant passes 503B. The p indirect-contact heat exchangers comprise a mixture of shell and tube style exchangers, plate style exchangers, plate and frame style exchangers, plate and shell style exchangers, spiral style exchangers, and plate fin style exchangers. A shaker for causing the second chamber to flex is provided 504B.

The process fluid is passed through the n exchangers in order from E1 through En. The process fluid comprises n product components. The n product components are in order from lowest freezing point, P1, to highest freezing point, Pn. The n product components are desublimated in exchangers E1 to En, producing n solid products from SP1 to SPn. The n solid products are produced one per exchanger, meaning SP1 is produced in E1 and SPn is produced in En 505. Of these, m products are formed in the m direct-contact exchangers 506A, and p products are formed in the p direct-contact exchangers 506B.

The n solid products are formed in the p indirect-contact heat exchangers by p product components desublimating to form p solid products on an outer surface of the second chamber 506B and causing the second chamber to flex, causing the p portions of the solid product or products to fall from the outer surface of the second chamber 507B. The p solid products are then removed 508B.

The m solid products are formed in the m direct-contact exchangers by m product components desublimating into m contact fluids to produce m solid products and entraining the m solid products in the m contact fluids to form m contact fluid slurries 507A. The m contact fluid slurries are then removed and separated into m solid products and reconstituted into the m contact fluid mixtures 508A.

In some embodiments, at least one of the n exchangers comprises an indirect-contact heat exchanger comprising a first chamber through which the process fluid passes and a second chamber through which a coolant passes. In some embodiments, the indirect-contact heat exchanger comprises a shell and tube style exchanger, plate style exchanger, plate and frame style exchanger, plate and shell style exchanger, spiral style exchanger, plate fin style exchanger, or combinations thereof. In some embodiments, the forming step is accomplished by a portion of the product component or components desublimating to form a portion of the solid product or products on an outer surface of the second chamber. In some embodiments, the separating step is accomplished by providing the indirect-contact heat exchanger with a means for causing the second chamber to flex, causing the portion of the solid product or products to fall from the outer surface of the second chamber and removing the portion of the solid product or products from the at least one indirect-contact heat exchanger. In some embodiments, the means for causing the second chamber to flex comprise a vibration inducing device attached to a portion of the indirect-contact heat exchanger, varying a pressure of the coolant, or combinations thereof. In some embodiments, the vibration inducing device comprises a piezoelectric actuator, ultrasound emitter, voice coil, linear resonant actuator, shaker, exciter, hydraulic actuator, solenoid actuator, blunt object, manual shaking, or a combination thereof. In some embodiments, the varying the coolant pressure step is further accomplished by constructing the second chamber from expanding and contracting corrugated tubes, wherein varying the pressure of the coolant causes the corrugated tubes to expand and contract. In other embodiments, the varying the coolant pressure step is accomplished by a pump operating at variable speeds, a valve rapidly opening and closing, or a combination thereof, causing the inner chamber to experience a hammering.

In some embodiments, the at least one direct-contact exchanger comprises spray towers, bubble contactors, mechanically agitated towers, direct-contact heat exchangers, direct-contact material exchangers, direct-contact heat and material exchangers, distillation columns, or combinations thereof. In some embodiments, a gas distributor is provided to the direct-contact exchanger, the gas distributor comprising a bubble plate, a bubble tray, a sparger, a nozzle, or a combination thereof. In some embodiments, the contact fluid comprises a solvent comprising water, hydrocarbons, liquid ammonia, liquid carbon dioxide, cryogenic liquids, or combinations thereof. In other embodiments, the contact fluid comprises a solvent and a compound, the solvent as above, while the compound comprises ionic compounds or organic compounds. In some embodiments, the ionic compounds comprise potassium carbonate, potassium formate, potassium acetate, calcium magnesium acetate, magnesium chloride, sodium chloride, lithium chloride, calcium chloride, or combinations thereof. In some embodiments, the organic compounds comprise glycerol, ammonia, propylene glycol, ethylene glycol, ethanol, methanol, hydrocarbons, or combinations thereof. In some embodiments, the forming step is accomplished by a portion of the product component or components desublimating in the contact fluid to produce a product-depleted process fluid and a portion of the solid product or products and entraining the portion of the solid product or products in the contact fluid to form a contact fluid slurry. In some embodiments, the separating step is accomplished by removing the product-depleted process fluid from the direct-contact exchanger, passing the contact fluid slurry to a separation vessel, separating the portion of the product or products from the contact fluid slurry, and reconstituting the contact fluid for recycle. In some embodiments, the separating and reconstituting steps are accomplished by a process comprising distillation, pressure-swing separation, liquid extraction, solid extraction, reverse osmosis, forward osmosis, filtration, stripping, or a combination thereof.

In some embodiments, the process fluid comprises flue gas, syngas, producer gas, natural gas, steam reforming gas, hydrocarbons, light gases, refinery off-gases, organic solvents, water, ammonia, liquid ammonia, or combinations thereof, and the plurality of product components comprising carbon dioxide, nitrogen oxide, sulfur dioxide, nitrogen dioxide, sulfur trioxide, hydrogen sulfide, hydrogen cyanide, water, mercury, hydrocarbons, pharmaceuticals, salts, biomass, or combinations thereof.

Combustion flue gas consists of the exhaust gas from a fireplace, oven, furnace, boiler, steam generator, or other combustor. The combustion fuel sources include coal, hydrocarbons, and biomass. Combustion flue gas varies greatly in composition depending on the method of combustion and the source of fuel. Combustion in pure oxygen produces little to no nitrogen in the flue gas. Combustion using air leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The method disclosed applies to any combustion flue gases. Dried combustion flue gas has had the water removed.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than water, including hydrogen, helium, carbon dioxide, nitrogen, and oxygen. This list is for example only and should not be implied to constitute a limitation as to the viability of other gases in the process. A person of skill in the art would be able to evaluate any gas as to whether it has higher volatility than water.

Refinery off-gases comprise gases produced by refining precious metals, such as gold and silver. These off-gases tend to contain significant amounts of mercury and other metals.

The invention claimed is:

1. A process for forming a solid product or products comprising:
providing n desublimating exchangers, a desublimating exchanger E1 being associated with a first desublimating exchanger and a desublimating exchanger En being associated with an nth desublimating exchanger, n representing the number of desublimating exchangers, the n desublimating exchangers comprising at least one direct-contact exchanger comprising a contact fluid;
passing a process fluid through the n desublimating exchangers in order from E1 through En, wherein the process fluid comprises a product component or components;
forming the solid product or products from the product component or components in the n desublimating exchangers by desublimation;
separating the solid product or products from the process fluid; and
wherein at least one of the n exchangers further comprises an indirect-contact heat exchanger comprising a first chamber through which the process fluid passes and a second chamber through which a coolant passes;
whereby the solid product or products is formed.

2. The process of claim 1, wherein the indirect-contact heat exchanger comprises a shell and tube style exchanger, plate style exchanger, plate and frame style exchanger, plate and shell style exchanger, spiral style exchanger, plate fin style exchanger, or combinations thereof.

3. The process of claim 1, wherein the forming step is accomplished by a portion of the product component or components desublimating to form a portion of the solid product or products on an outer surface of the second chamber.

4. The process of claim 3, wherein the separating step is accomplished by providing the indirect-contact heat exchanger with a means for causing the second chamber to flex, causing the portion of the solid product or products to fall from the outer surface of the second chamber and removing the portion of the solid product or products from the at least one indirect-contact heat exchanger.

5. The process of claim 4, wherein the means for causing the second chamber to flex comprise a vibration inducing device attached to a portion of the indirect-contact heat exchanger, varying a pressure of the coolant, or combinations thereof.

6. The process of claim 5, providing the vibration inducing device comprising a piezoelectric actuator, ultrasound emitter, voice coil, linear resonant actuator, shaker, exciter, hydraulic actuator, solenoid actuator, blunt object, manual shaking, or a combination thereof.

7. The process of claim 4, wherein the means for causing the second chamber to flex comprise varying the coolant pressure by constructing the second chamber from expanding and contracting corrugated tubes, wherein varying the pressure of the coolant causes the corrugated tubes to expand and contract.

8. The process of claim 5, wherein the varying coolant pressure step is accomplished by a pump operating at variable speeds, a valve opening and closing, or a combination thereof, causing the inner chamber to experience a hammering.

9. The process of claim 1, wherein the at least one direct-contact exchanger comprises spray towers, bubble contactors, mechanically agitated towers, direct-contact heat exchangers, direct-contact material exchangers, direct-contact heat and material exchangers, distillation columns, or combinations thereof.

10. The process of claim 9, further comprising providing a gas distributor to the direct-contact exchanger, the gas distributor comprising a bubble plate, a bubble tray, a sparger, a nozzle, or a combination thereof.

11. The process of claim 1, providing the process fluid comprising flue gas, syngas, producer gas, natural gas, steam reforming gas, hydrocarbons, light gases, refinery off-gases, organic solvents, water, ammonia, liquid ammonia, or combinations thereof.

12. The process of claim 11, providing the product component or components comprising carbon dioxide, nitrogen oxide, sulfur dioxide, nitrogen dioxide, sulfur trioxide, hydrogen sulfide, hydrogen cyanide, water, mercury, hydrocarbons, pharmaceuticals, salts, biomass, or combinations thereof.

13. A process for forming a solid product or products comprising:
providing n desublimating exchangers, a desublimating exchanger E1 being associated with a first desublimating exchanger and a desublimating exchanger En being associated with an nth desublimating exchanger, n representing the number of desublimating exchangers, the n desublimating exchangers comprising:
m direct-contact exchangers and m contact fluids, m representing the number of direct-contact exchangers and having a value between 1 and n, wherein a direct-contact exchanger DCE1 is associated with a first direct-contact exchanger comprising a first contact fluid and a direct-contact exchanger DCEm is associated with an mth direct-contact exchanger comprising an mth contact fluid, wherein the first contact fluid through the mth contact fluid comprise a solvent or a mixture of a solvent and a compound, the solvent comprising water, hydrocarbons, liquid ammonia, liquid carbon dioxide, cryogenic liquids, or combinations thereof, and the compound comprising:
ionic compounds comprising potassium carbonate, potassium formate, potassium acetate, calcium magnesium acetate, magnesium chloride, sodium chloride, lithium chloride, calcium chloride, or combinations thereof; or,
organic compounds comprising glycerol, ammonia, propylene glycol, ethylene glycol, ethanol, methanol, hydrocarbons, or combinations thereof;
the m direct-contact exchangers further comprising spray towers, bubble contactors, mechanically agitated towers, direct-contact heat exchangers, direct-contact material exchangers, direct-contact heat and material exchangers, distillation columns, or combinations thereof;
the m direct-contact exchangers further comprising m gas distributors comprising bubble plates, bubble trays, spargers, nozzles, or a combination thereof;
p indirect-contact heat exchangers, p representing the difference between n and m, wherein an indirect-contact heat exchanger ICHE1 is associated with a first indirect-contact exchanger and an indirect-contact heat exchanger ICHEp is associated with a pth indirect-contact heat exchanger, the p indirect-contact heat exchangers comprising:
a first chamber through which the process fluid passes and a second chamber through which a coolant passes;
a shell and tube style exchanger, plate style exchanger, plate and frame style exchanger, plate and shell style exchanger, spiral style exchanger, plate fin style exchanger, or combinations thereof; and,
a means for causing the second chamber to flex comprising a vibration inducing device attached to a portion of the indirect-contact heat exchanger, varying a pressure of the coolant, or combinations thereof, wherein the vibration inducing device comprises a piezoelectric actuator, ultrasound emitter, voice coil, linear resonant actuator, shaker, exciter, hydraulic actuator, solenoid actuator, blunt object, manual shaking, or a combination thereof, and wherein varying the coolant pressure is accomplished by constructing the second chamber from expanding and contracting corrugated tubes, wherein varying the coolant pressure causes the corrugated tubes to expand and contract, or by a pump operating at variable speeds, a valve opening and closing, or a combination thereof, causing the inner chamber to experience a hammering;
passing the process fluid through the n desublimating exchangers in order from E1 through En, wherein the process fluid comprises a plurality of product components; and,
forming the solid product or products from the plurality of product components, wherein:
the forming step in the p indirect-contact heat exchangers is accomplished by p portions of the plurality of product components desublimating to form p portions of the solid product or products on an outer surface of the second chamber and causing the second chamber to flex, causing the p portions of the solid product or products to fall from the outer surface of the second chamber; and,
the forming step in the m direct-contact exchangers is accomplished by m portions of the plurality of product components desublimating in the m contact fluids to produce m portions of the solid product or products and entraining the m portions of the solid product or products in the m contact fluids to form m contact fluid slurries;
separating the solid product or products from the process fluid, wherein:
the separating step in the p indirect-contact heat exchangers is accomplished by removing the p portions of the solid product or products from the p indirect-contact heat exchangers; and,
the separating step in the m direct-contact exchangers is accomplished by removing the m contact fluid slurries to m separation vessels, separating the m portions of the product or products from the m contact fluid slurries, and reconstituting the m contact fluids for recycle, wherein the separating and reconstituting steps are accomplished by a process comprising distillation, pressure-swing separation, liquid extraction, solid extraction, reverse osmosis, forward osmosis, filtration, stripping, or a combination thereof;
whereby a solid product or products is formed.

14. The process of claim 13, providing the process fluid comprising flue gas, syngas, producer gas, natural gas, steam reforming gas, hydrocarbons, light gases, refinery off-gases, organic solvents, water, ammonia, liquid ammonia, or combinations thereof, and the plurality of product components comprising carbon dioxide, nitrogen oxide, sulfur dioxide, nitrogen dioxide, sulfur trioxide, hydrogen sulfide, hydrogen cyanide, water, mercury, hydrocarbons, pharmaceuticals, salts, biomass, or combinations thereof.

15. The process of claim 13, the reconstituting the m contact fluids step further comprises recuperating heat from the m−1 contact fluid by the mth contact fluid slurry.

16. A process for forming a solid product or products comprising:
providing n desublimating exchangers, a desublimating exchanger E1 being associated with a first desublimating exchanger and a desublimating exchanger En being associated with an nth desublimating exchanger, n representing the number of desublimating exchangers, the n desublimating exchangers comprising at least one direct-contact exchanger comprising a contact fluid;
passing a process fluid through the n desublimating exchangers in order from E1 through En, wherein the process fluid comprises a product component or components;
forming the solid product or products from the product component or components in the n desublimating exchangers by desublimation;
separating the solid product or products from the process fluid;
wherein the forming step is accomplished by a portion of the product component or components desublimating in the contact fluid to produce a product-depleted process fluid and a portion of the solid product or products and entraining the portion of the solid product or products in the contact fluid to form a contact fluid slurry;
wherein the separating step is accomplished by removing the product-depleted process fluid from the direct-contact exchanger, passing the contact fluid slurry to a separation vessel, separating the portion of the product or products from the contact fluid slurry, and reconstituting the contact fluid for recycle;
wherein the separating and reconstituting steps are accomplished by a process comprising distillation, pressure-swing separation, liquid extraction, solid extraction, reverse osmosis, forward osmosis, filtration, stripping, or a combination thereof; and
wherein the contact fluid comprises a solvent or a mixture of a solvent and a compound, the solvent comprising water, hydrocarbons, liquid ammonia, liquid carbon dioxide, cryogenic liquids, or combinations thereof, and the compound comprising:
  ionic compounds comprising potassium carbonate, potassium formate, potassium acetate, calcium magnesium acetate, magnesium chloride, sodium chloride, lithium chloride, calcium chloride, or combinations thereof; or,
  organic compounds comprising glycerol, ammonia, propylene glycol, ethylene glycol, ethanol, methanol, hydrocarbons, or combinations thereof;
whereby the solid product or products is formed.

* * * * *